United States Patent [19]
Adleff

[11] Patent Number: 4,821,846
[45] Date of Patent: Apr. 18, 1989

[54] ACTUATING DEVICE FOR A DISK BRAKE

[75] Inventor: Kurt Adleff, Crailsheim, Fed. Rep. of Germany

[73] Assignee: J. M. Voith GmbH, Fed. Rep. of Germany

[21] Appl. No.: 47,895

[22] Filed: May 7, 1987

[30] Foreign Application Priority Data

May 9, 1986 [DE] Fed. Rep. of Germany ....... 3615589

[51] Int. Cl.$^4$ ................. F16D 55/26; F16D 55/18
[52] U.S. Cl. ................. 188/72.6; 188/72.4; 188/73.41; 188/369
[58] Field of Search ............ 188/72.6, 72.9, 72.1, 188/73.41, 72.4, 72.5, 59, 369, 233

[56] References Cited

U.S. PATENT DOCUMENTS

| | | |
|---|---|---|
| 2,827,132 | 3/1958 | Buyze . |
| 3,465,849 | 9/1969 | Bernfeld et al. . |
| 3,520,386 | 7/1970 | Roger . |
| 3,680,663 | 8/1972 | Kine ................ 188/72.9 X |
| 4,234,061 | 11/1980 | Margetts et al. ........... 188/72.4 X |
| 4,374,552 | 2/1983 | Dayen ................ 188/72.9 |
| 4,580,663 | 4/1986 | Lehnert . |

FOREIGN PATENT DOCUMENTS

| | | | |
|---|---|---|---|
| 0647104 | 6/1937 | Fed. Rep. of Germany ........ 188/59 |
| 2156629 | 5/1973 | Fed. Rep. of Germany ........ 188/59 |
| 0187120 | 10/1984 | Japan ................ 188/72.1 |
| 1494730 | 12/1977 | United Kingdom . |
| 2054072 | 2/1981 | United Kingdom . |

Primary Examiner—George E. A. Halvosa
Assistant Examiner—Richard Potosnak
Attorney, Agent, or Firm—Ostrolenk, Faber, Gerb & Soffen

[57] ABSTRACT

An actuating device for a disk brake operates two brake shoes to move axially against the opposite sides of the brake disk. Each brake shoe is connected by a pin to a brake caliper half. Each brake caliper half is comprised of two levers spaced one above the other, with one end of the lever attached to the respective brake shoe for the brake caliper half, the other end of the lever attached to the respective side of the actuator for the caliper halves and all of the levers being pivotable about a common mounting pin disposed between the brake shoes and the actuator. The levers of the pairs alternate so that each brake caliper half is slightly offset along the mounting pin from the central plane of the brake. All levers are identically shaped. Each pair of levers is connected by a respective pin at the actuator and a respective pin at the brake shoe.

13 Claims, 3 Drawing Sheets

ACTUATING DEVICE FOR A DISK BRAKE

BACKGROUND OF THE INVENTION

The present invention relates to an actuating device for a disk brake. There are two brake shoes at opposite sides of the brake disk which are moved axially into contact with the disk for braking. The actuating device is in the form of cooperating brake caliper halves each for operating on a respective brake shoe to move it against one of the opposite sides of a rotatable brake disk. The brake caliper halves are operated upon by a common actuator, which has respective actuating elements which engage each brake caliper half and move the brake caliper halves to move the brake shoes. Those actuating elements are on an actuator basis. A plane between the actuator axis and the axis of rotation of the brake disk is defined as a central plane of the brake.

Each brake caliper half is comprised of a plurality of levers one above the other. All of the levers of both brake caliper halves are supported on one or more mounting pins about which the levers pivot.

One known device of this type, shown in Federal Republic of Germany Pat. No. 30 11 006, which corresponds to British Pat. No. 2,054,072, advantageously has the two brake calipers halves mounted on a common central mounting pin. As a result, the pin is stressed predominantly only in shear and only to a slight extent in flexure. The manufacture of the two brake caliper halves is facilitated by the fact that they are identical, but it is made difficult because of their relatively complicated shape. This makes it necessary to manufacture the brake caliper halves preferably by casting or welding, as necessary.

Actuating devices in which the two brake caliper halves are identical and are mounted on a common central mounting pin are also known from British Pat. No. 1,494,730 and U.S. Pat. No. 3,465,849. U.S. Pat. No. 2,827,132 describes an actuating device in which the two brake caliper halves are mounted on a common central mounting pin, but have different dimensions.

Federal Republic of Germany DE-OS No. 33 08 499, which corresponds to U.S. Pat. No. 4,580,663, shows a different construction in which each of the two brake caliper halves is mounted on a separate mounting pin, requiring two separate mounting pins. These are furthermore stressed predominantly in flexure. Each brake caliper half is formed of two identical, relatively simply shaped levers and of two connecting pins arranged on the ends of the levers. This facilitates the manufacture of the brake caliper halves. But, it has the serious disadvantage that two separate mounting pins are necessary for the mounting of the brake caliper halves. This construction is similar to the construction in Federal Republic of Germany Provisional Pat. No. AS 17 25 038, which corresponds to U.S. Pat. No. 3,520,386.

SUMMARY OF THE INVENTION

The present invention has the following objective. Starting from an actuating device which has only a single common mounting pin for mounting both brake caliper halves, the simplest and cheapest possible construction for the brake caliper halves is desired. At the same time, expensive techniques of connection (bolting, welding, etc.) should be avoided, as far as possible. In addition, the largest possible number of identical parts are to be used so that fewer different parts need to be manufactured.

This objective is achieved by the invention.

Each brake caliper half is comprised of a plurality, and particularly two levers disposed one above the other. All levers of both caliper halves are identical, although in one caliper half the levers are arranged in mirror image fashion with respect to the other caliper half. All of the levers are flat metal plates which lie flat in a plane generally parallel to the central plane. One end of each lever is connected to the respective brake shoe for that brake caliper half. This is accomplished through a first pin that extends between the two levers and is also attached to the respective brake shoe. The other end of each lever is attached to the actuator, again by a second pin that extends between the two levers and is attached to the respective actuator element. For all levers, at the region between the actuator and the brake shoes, there is a single common mounting pin for all of the levers about which all of the levers pivot. All of the pins are parallel and are oriented generally transverse to the axis of the brake disk.

Each brake caliper half, comprised of its two levers, is displaced or offset along the direction of the common mounting pin from the central plane, so that the central plane does not run through the middle of each caliper half midway between the two levers. Each brake caliper half is displaced from the central plane but overlaps it, with one below and one above the central plane. The brake caliper halves are displaced so that for each half, the lever closer to the central plane is located between the two levers of the other brake caliper half.

The invention is based on the discovery that despite the presence of only a single common mounting pin, the identical mirror image brake caliper halves are formed from simply shaped levers, by placing the alternate levers one from each brake caliper half in sequence along the common central mounting pin. To make this possible, each brake caliper half is arranged shifted from the central plane of the actuating device as a whole, as seen in the direction parallel to the axis of rotation of the brake disk, so that one brake caliper half is shifted above and one brake caliper half is shifted below the central plane.

Each brake shoe is connected to the respective connecting pin of its brake caliper half by means of a single connector in the form of a pin which extends parallel to the axis of rotation of the brake disk. The connector in the form of a connecting pin between the levers of each brake calipers half extends generally parallel to the common mounting pin, transversely of the axis of the brake disk.

In addition to the levers being identical, the various connecting pins, those between the brake caliper halves and the actuator and between the brake caliper halves and the brake shoes, are at least substantially of identical shape.

Initially, considerable doubts existed as to the performance of this arrangement, since the two levers of each brake caliper half are stressed unequally. It was feared that the unequal stressing of the levers would lead to non-uniform wear of the brake shoe linings. Since, however, this is also true when the brake shoes and the brake disk lie in planes which are not precisely parallel to each other or if the brake disk has a "run-out" (as must always be expected), the non-uniform stressing of the levers can be accepted. This also can be accepted because the invention has the advantage that the levers can be manufactured at extremely small expense. The levers can be cut by torch from metal plate and then three holes can be produced in each lever, for the two connecting pins and the common central mounting pin.

Manufacture can be further simplified through the levers and the connecting pins being connected with each other simply by inserting the pins into their levers, so that screw attachments are dispensed with.

The brake shoes themselves may be developed as flat metal plate parts. Each of the brake shoes extends a vertical distance along the direction of the mounting pin beyond the levers of its brake caliper half to be supported by an additional mounting against a stationary structural part for the direct transfer of brake reaction forces.

Other objects and features of the invention are shown in the accompanying drawings, in which one embodiment is shown.

DESCRIPTION OF A PREFERRED EMBODIMENT

Figure 1:
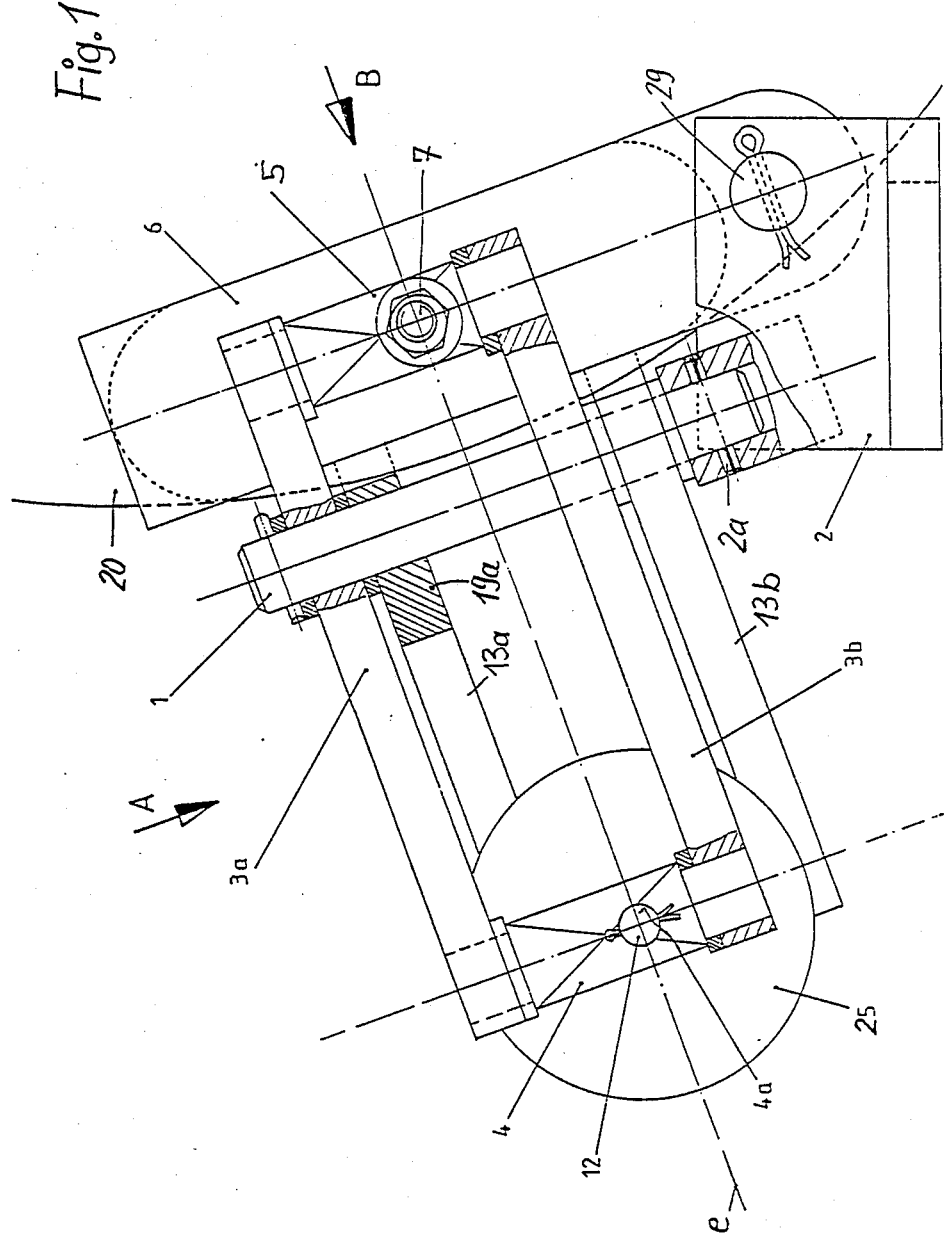
FIG. 1 is a side view of an actuating device of the invention, seen in the direction of the axis of rotation of the brake disk.

There is a single central mounting pin 1 which is fastened in a support 2 by means of a heavy dowel pin 2a. Four identically shaped brake levers are oriented parallel to each other and are arranged one above the other along the mounting pin 1. They include two left brake levers 3a and 3b and two right brake levers 13a and 13b. The left brake levers and the right brake levers alternate one above the other on the mounting pin 1.

The two brake levers 3a and 3b, on the one hand, and 13a and 13b, on the other hand, of each brake caliper half are respectively connected to each other by connectors comprised of two connecting pins 4 and 5 and 14 and 15, respectively. Each two brake levers and their two connecting pins form a brake caliper half.

Figure 2:
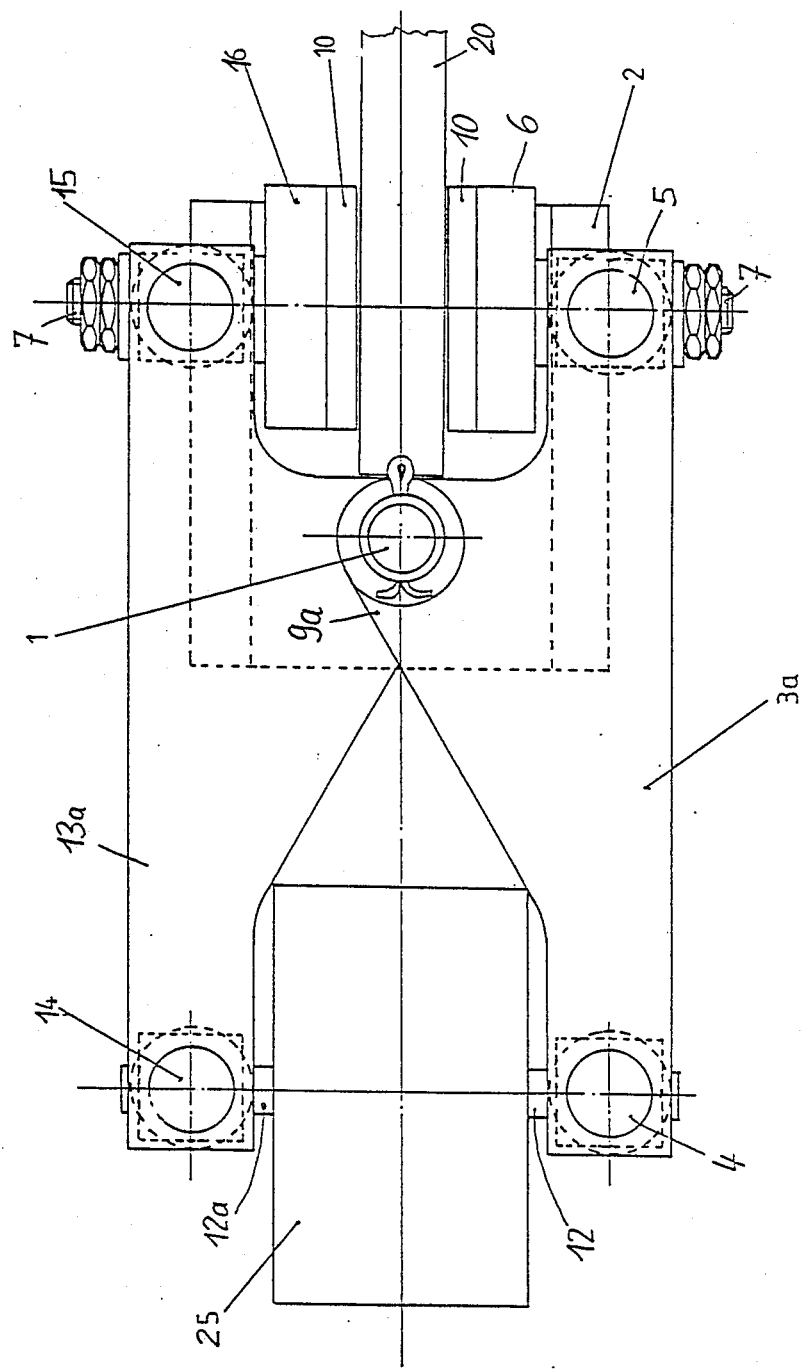
FIG. 2 is a view in the direction of the arrow A of FIG. 1.

The four brake levers 3a, 3b and 13b, 13b are identical. They are developed as flat metal-plate parts of uniform thickness. No machining is required on the levers, except for the production of three holes in each. Since only a single common mounting pin 1 is present for the four levers, the levers have, in rough approximation, a triangular shape, as seen in FIG. 2. The levers have "corners" formed by the mounting lugs 9a, 9B, and 19a, 19b respectively, which all receive the mounting pin 1.

Each connecting pin 4, 5, 14 and 15 is provided with a transverse hole, for instance 4a and 5a in pins 4 and 5, respectively, to receive connecting parts or actuating elements of the actuator 25 for each of the brake caliper halves, and in pins 14 and 15 to receive connecting parts from brake shoes 6, 16 on the levers 3 and 13, respectively.

The actuator is, for instance, a pneumatic cylinder. It has oppositely projecting actuating elements 12 and 12a which actuate the respective brake caliper halves by moving outward and inward together. Together elements 12 and 12a define an axis of the actuator. In FIG. 1, the so-called center plane e is determined by the axis of the actuator 25 and by the axis of rotation of the brake disk 20, which lies far to the right of FIG. 1.

Although the brake caliper halves are displaced along the mounting pin 1 from the central plane e, because of the aforementioned alternate arrangement in layers of the brake levers 3a, 13a, 3b, 13b, the transverse holes through the pins must nevertheless lie in the central plane e, i.e. they must be shifted from the center of the length of the respective connecting pins. As a result of that shift and of the alternating arrangement in layers of the levers 3a, 3b and 13a, 13b, all the points of introduction of force upon the two brake caliper halves in the installed condition lie in the central plane e.

In order to simplify the manufacture, the four connecting pins 4, 5, 14, and 15 can be developed substantially or entirely identical to each other. They are produced preferably from square stock which can remain unmachined, aside from the turning on the lathe of the two end pins that are received in the respective connected levers, and the production of the respective transverse hole in each connecting pin.

The actuating element bars 12 and 12a of the actuator 25 are inserted into the transverse holes, for instance 4a, for the connecting pins 4 and 14 and are held fast there by cotter pins.

Figure 3:
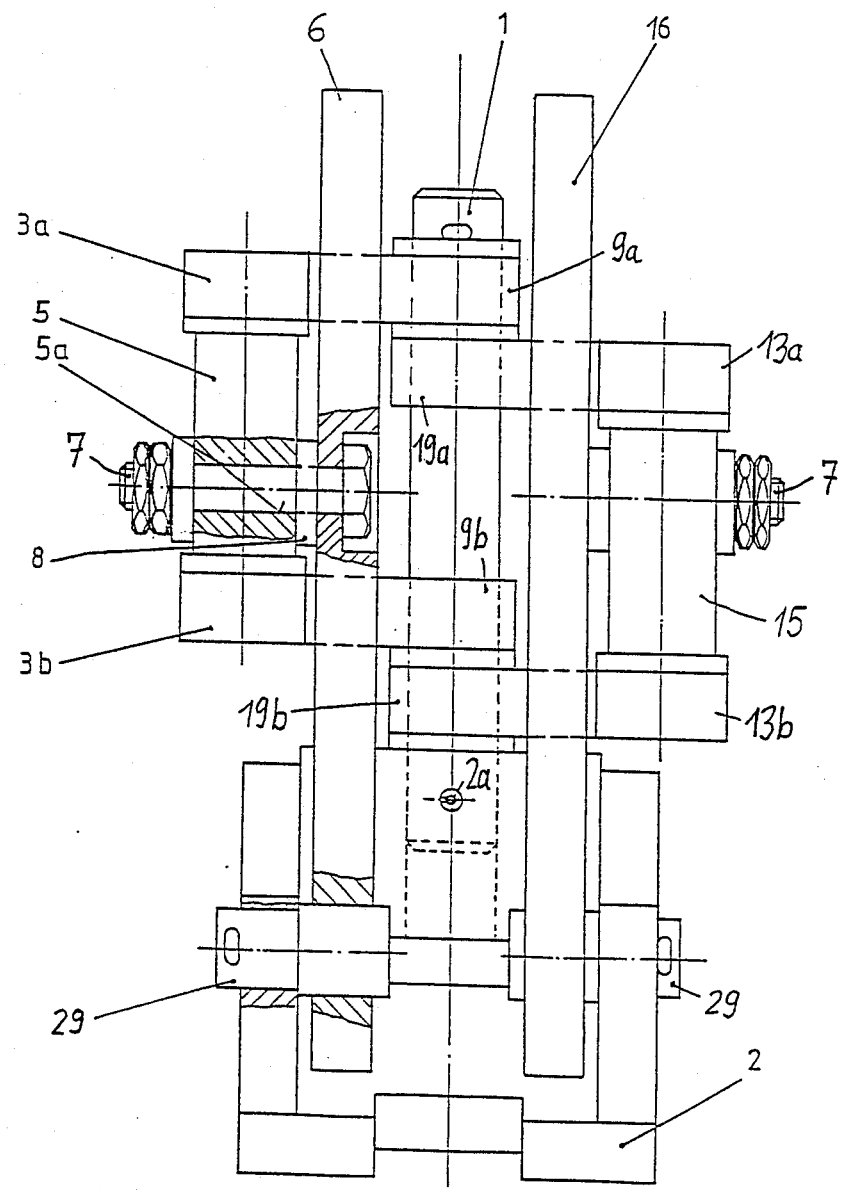
FIG. 3 is a view in the direction of the arrow B of FIG. 1.

Each brake shoe 6 and 16 is connected by a fit screw 7 to the respective one of the two connecting pins 5 or 15. In addition, spacer rings 8 are also placed over the fit screws. Theretofore, the brake shoes 6 and 16 are developed as simple flat metal-plate parts which can be produced preferably by cutting with a torch. The brake shoes 6 and 16 bear in customary manner brake linings 10 which act on the side surfaces of brake disk 20 (FIG. 2). The brake linings have been omitted in FIG. 3.

The brake shoes 6 and 16 can be mounted in the support 2 by means of additional set bolts 29. In this way, the brake reaction forces can be transmitted directly from the brake shoes into the support 2, instead of via the brake caliper halves. This can be utilized in particular with larger disk brakes in order to reduce the load on the brake caliper halves by the brake reaction forces or to eliminate it entirely. In this way, the development of the brake levers as flat metal plate parts can be established, even if very high brake reaction forces occur. Furthermore, the set bolts 29 also serve as anti-turning locks for the brake shoes 6 and 16. Such an anti-turning lock or a similar one, not shown, is usually necessary, since each brake shoe is fastened to its brake caliper half only by a single screw 7.

Although the present invention has been described in connection with a preferred embodiment thereof, many variations will now become apparent to those skilled in the art. It is preferred, therefore, that the present invention be limited not by the specific disclosure herein, but only by the appended claims.

What is claimed is:

1. An actuating device for a disk brake, wherein the brake comprises:

a brake disk and means for supporting the disk for rotation around a disk axis, the disk having opposite sides; a respective brake shoe at each opposite side of the disk, the brake shoes being supported for movement generally along the direction of the disk axis into engagement with and disengagement from the disk for braking the rotation of the disk;

an actuator for the brake shoes, spaced from the brake shoes and from the disk, and operative for moving the brake shoes to engage the disk; the actuator having an axis oriented so that the axis of the actuator and the axis of the disk are generally in and define a central plane of the brake;

the actuating device comprising;

the actuator;

two substantially identical but mirror image arranged brake caliper halves, one brake caliper half being connected to one of the brake shoes at one side of the brake disk and the other brake caliper half being connected to the other brake shoe at the other side of the brake disk; each brake caliper half having a first section away from the disk which is coupled to the actuator for being moved by the actuator and having a second section toward the disk which is coupled to a respective brake shoe, such that operation of the common actuator along the actuator axis operates through the respective brake caliper half to operate the respective brake shoe;

a common mounting pin disposed between the disk and the actuator and extending in a direction generally transverse to the axis of the disk;

each brake caliper half comprising two substantially identically shaped, substantially parallel brake levers spaced apart along the common mounting pin, each brake lever being generally a flat plate lying in a plane parallel to the central plane of the brake; each brake lever including a mounting lug which receives the common mounting pin, and the common mounting pin serves as a common pivot axis for each of the levers;

for each brake caliper half, a first connector comprising a connecting pin between the levers of each brake caliper half for connecting the levers of the respective brake caliper half to the respective brake shoe at one respective side of the disk;

a second connector between the levers of each brake caliper half, the second connector comprising a second connecting pin for connecting the levers of the respective brake caliper half to the actuator;

each brake caliper half, viewed as a whole, being arranged displaced along the common mounting pin from the central plane of the brake and one of the two levers of each brake caliper half is disposed between the two levers of the other brake caliper half along the direction of the mounting pin.

2. The actuating device of claim 1, wherein the first connecting pin extends into each of the levers of the respective brake caliper half and the second connecting pin extends into each of the levers of the respective brake caliper half, and the first connecting pin is also connected with the respective brake shoe and the second connecting pin is also connected with the actuator.

3. The actuating device of claim 2, wherein the actuator includes actuating elements which move in axially opposite directions, a respective one of the actuating elements engages the respective second connector pin of each of the brake caliper halves for moving the brake caliper halves in opposite directions simultaneously around the common mounting pin.

4. The actuating device of claim 1, further comprising an additional mounting for each of the brake shoes, spaced remotely from the levers, for supporting the brake shoes and for defining a stationary structural part for the direct transfer of brake reaction forces.

5. The actuating device of claim 4, wherein each brake shoe is developed as a flat metal plate to which both levers of one respective brake caliper half are secured.

6. The actuating device of claim 1, wherein each brake shoe is developed as a flat metal plate to which both levers of one respective brake caliper half are secured.

7. The actuating device of claim 2, wherein each of the connecting pins is of substantially identical shape.

8. The actuating device of claim 1, further comprising a respective third connector between the first connecting pin and the respective brake shoe of each brake caliper half.

9. The actuating device of claim 1, further comprising a respective third connecting pin extending from the first connecting pin generally parallel to the axis of the disk for connecting the respective levers of the brake caliper half to the brake shoe.

10. The actuating device of claim 2, further comprising a respective third connector from the respective first connecting pin to the respective brake shoe of the brake caliper half.

11. The actuating device of claim 10, wherein the respective third connector from the first connecting pin comprises a third pin which extends parallel to the axis of the brake disk and extends between the first pin and the brake shoe.

12. The actuating device of claim 3, further comprising a respective third connecting pin generally parallel to the axis of the disk for connecting the respective levers of each brake caliper half to the respective brake shoe.

13. The actuating device of claim 2, further comprising a respective third connecting pin generally parallel to the axis of the disk for connecting the respective levers of each brake caliper half to the respective brake shoe.

* * * * *